(12) United States Patent
Mezzasalma et al.

(10) Patent No.: US 8,977,381 B1
(45) Date of Patent: Mar. 10, 2015

(54) CNC CONTROLLED ROTATING WORK PIECE HOLDING FIXTURES FOR A HORIZONTAL MILL

(76) Inventors: Jerome Mezzasalma, Costa Mesa, CA (US); Kevin Liboon, Garden Grove, CA (US)

( * ) Notice: Subject to any disclaimer, the term of this patent is extended or adjusted under 35 U.S.C. 154(b) by 246 days.

(21) Appl. No.: 13/607,797

(22) Filed: Sep. 9, 2012

Related U.S. Application Data (60) Provisional application No. 61/533,051, filed on Sep. 9, 2011.

(51) Int. Cl.
*G05B 19/18* (2006.01)
*B23Q 1/25* (2006.01)

(52) U.S. Cl.
CPC ........................................ *B23Q 1/25* (2013.01)
USPC ....................................................... 700/160

(58) Field of Classification Search
CPC ............... B23Q 11/10; B24B 3/02; G05B 2219/34465; G05B 2219/50335; G05B 2219/49244; G05B 2219/45159; G05B 2219/33099; G05B 19/404; G05B 2219/50313; G05B 2219/50334; G05B 2219/45161; G05B 2219/37251; G05B 2219/49052; G05B 2219/50015
USPC ......................................................... 700/160
See application file for complete search history.

(56) References Cited

U.S. PATENT DOCUMENTS

| | | | |
|---|---|---|---|
| 5,454,148 A | 10/1995 | Ewer et al. | |
| 5,871,315 A * | 2/1999 | Burt et al. | 409/225 |
| 6,619,895 B1 * | 9/2003 | Durfee, Jr. | 409/221 |
| 6,949,056 B2 | 9/2005 | Soroka et al. | |
| 7,156,384 B1 | 1/2007 | Varnau | |
| 7,172,676 B2 * | 2/2007 | DeMeter | 156/379.6 |
| 7,686,553 B2 | 3/2010 | Durfee, Jr. | |
| 8,091,191 B2 * | 1/2012 | Nelson et al. | 29/27 C |
| 2004/0176229 A1 | 9/2004 | Soroka et al. | |
| 2006/0065085 A1 * | 3/2006 | Olczak | 82/118 |
| 2007/0033786 A1 * | 2/2007 | Bradley | 29/50 |

* cited by examiner

*Primary Examiner* — Kenneth Lo
*Assistant Examiner* — Derrick Boateng
(74) *Attorney, Agent, or Firm* — Kenneth L. Green (57) ABSTRACT

A CNC controlled rotating workpiece holding fixture is attached to a tombstone of a horizontal mill. The rotating workpiece holding fixture(s) allows workpieces to be independently rotated to allow milling of various surface of the workpiece thereby providing a five axis CNC capability. As many as eight rotating workpiece holding fixtures may be attached to a single tombstone. Each rotating workpiece holding fixture may be formed by a harmonic drive driven by a servo motor which provides a compact configuration and a very low gear ratio in the harmonic drive combined with the inherent braking of the servo motor provides stability. The rotating workpiece holding fixtures may be controlled using existing auxiliary outputs (e.g., M-Codes), present in CNC milling machines. The M-Codes are preferably created by an operator, multiplexed, sent to the tombstone, de-multiplexed, and used to control each rotating workpiece holding fixture.

11 Claims, 7 Drawing Sheets

CNC CONTROLLED ROTATING WORK PIECE HOLDING FIXTURES FOR A HORIZONTAL MILL

The present application claims the priority of U.S. Provisional Patent Application Ser. No. 61/533,051 filed Sep. 9, 2011, which application is incorporated in its entirety herein by reference.

BACKGROUND OF THE INVENTION

The present invention relates to horizontal milling machines and in particular to rotating workpiece holding fixtures providing a fifth CNC controlled axis.

Known horizontal milling machines include four CNC controlled axes: a vertical spindle axis (Y); a horizontal spindle axis (X); a lateral depth workpiece fixture axis (Z); and a workpiece vertical rotational axis (B). While five axis vertical and horizontal milling machines are available, they are generally about three times the cost of a four axis horizontal milling machine.

BRIEF SUMMARY OF THE INVENTION

The present invention addresses the above and other needs by providing at least one CNC controlled rotating workpiece holding fixture which is attached to a tombstone of a horizontal mill. The CNC controlled rotating workpiece holding fixture(s) allows workpieces to be independently rotated to allow milling of various surface of the workpiece thereby providing a five axis CNC capability. A preferred embodiment includes as many as eight rotating workpiece holding fixtures to attached to a single tombstone. In one embodiment, each rotating workpiece holding fixture is formed by a harmonic drive driven by a servo motor. The novel combination of the harmonic drive and servo motor provides a compact stable configuration and a very low gear ratio in the harmonic drive combined with the inherent braking of the servo motor provides stability. The rotating workpiece holding fixtures may be controlled using existing auxiliary outputs (e.g., G-codes and M-Codes), present in CNC milling machines. The G-codes are preferably created by an operator, multiplexed, sent to the tombstone, de-multiplexed, and used to control each rotating workpiece holding fixture.

In accordance with one aspect of the invention, there is provided a CNC controlled rotating workpiece holding fixture comprising a harmonic drive and a servo motor. Known rotatable workpiece holders use large motors to position the workpiece and provide position holding. There is not sufficient space on a tombstone to mount more than one of these motors. The combination of a low ratio harmonic drive, for example at least 50 to one, and a servo motor provides the necessary position holding in a small envelope.

In accordance with one aspect of the invention, there is provided a CNC controlled rotating workpiece holding fixture receiving a multiplexed control signal. Servo motors required suitable for the present invention require as many as twelve wires. A tombstone with, for example, eight rotating workpiece holding fixtures, would this require a 96 conductor cable. There is insufficient space for such a cable rendering this approach impractical. Multiplexing reduces the wire requirement from 96 to four which is practical for a multiplicity of rotating workpiece holding fixtures mounted to a tombstone.

In accordance with one aspect of the invention, there is provided a method for controlling rotating workpiece holding fixtures. The method includes. attaching a tombstone to the horizontal mill, attaching between two and eight CNC controlled rotating workpiece holding fixture mounted to the tombstone, each rotating workpiece holding fixture including a harmonic drive and a servo motor; executing a CNC program including M-codes and G-codes generating rotating workpiece holding fixture commands for each rotating workpiece holding fixture, sending parallel DPRNT commands to a control box for each rotating workpiece holding fixture, the parallel DPRNT commands generated by the CNC controller based on instruction in the G-code and provided to the control box, multiplexing the parallel DPRNT commands to provide a multiplexed signal, sending activation signals from the CNC controller to an M-code relay, the sending triggered by the M-code, forwarding the activation signals to a control box, providing the multiplexed parallel DPRNT commands generated by the control box to the tombstone after receiving the activation signal from the M-code relay, receiving the multiplexed parallel DPRNT commands by a controller residing in the tombstone and de-multiplexing the multiplexed parallel DPRNT commands to obtain individual rotating workpiece holding fixtures commands, providing position signals to the rotating workpiece holding fixtures and providing rotating workpiece holding fixture position information back to the controller, communicating from the controller to the control box providing a first motion finished signal to the control box, communicating between the control box and the M-code relay providing a second motion finished signal to the M-code relay and communicating between the M-code relay and the CNC controller providing a third motion finished signal to the CNC controller.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
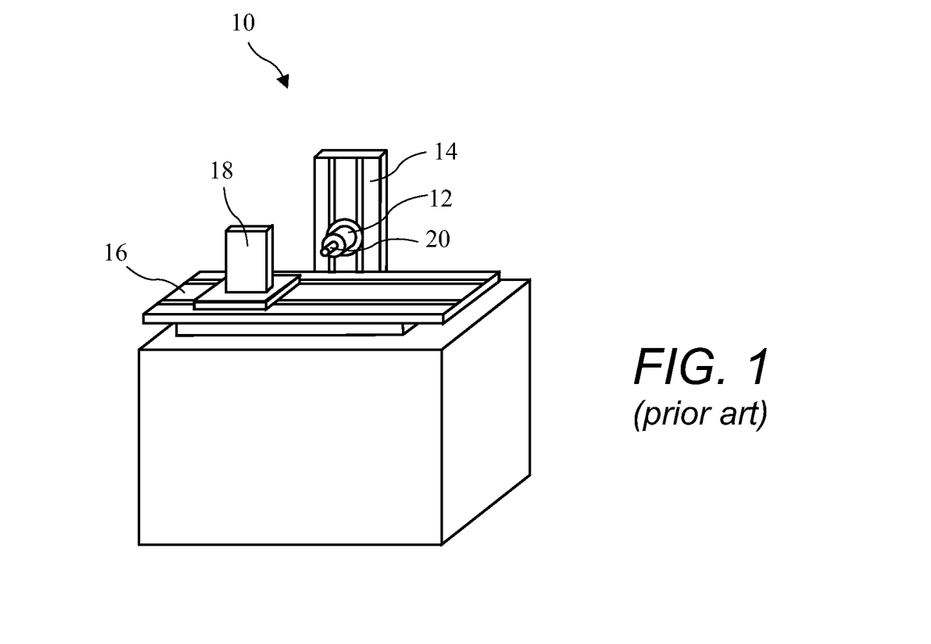
FIG. 1 shows a prior art horizontal milling machine.

A prior art horizontal milling machine 10 is shown in FIG. 1. The horizontal milling machine 10 includes vertical guide 14 carrying a spindle 12 and a horizontal table 16 carrying a tombstone 18. The tombstone 18 moves laterally along the table 16 to position a workpiece attached to the tombstone 18 for milling by a cutter 20 carried by the spindle 12.

Figure 2:
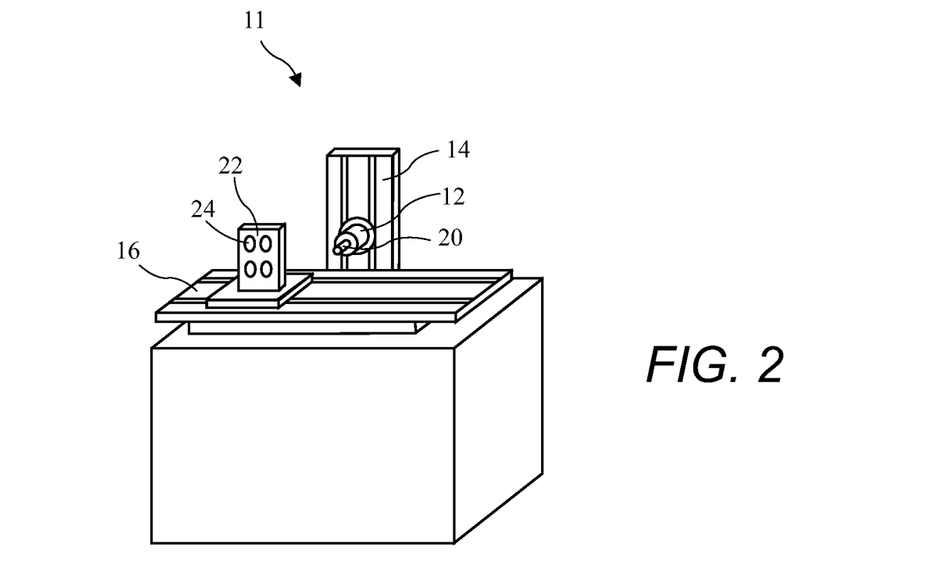
FIG. 2 shows a horizontal milling machine including rotating workpiece holding fixtures attached to a tombstone according to the present invention.

A horizontal milling machine 11 according to the present invention including rotating workpiece holding fixtures 24 attached to the tombstone 22 is shown in FIG. 2. Four of the rotating workpiece holding fixtures 24 are shown built into a face of the tombstone 22. Other embodiments of the present invention are shown in FIGS. 5A-12B.

Figure 3:
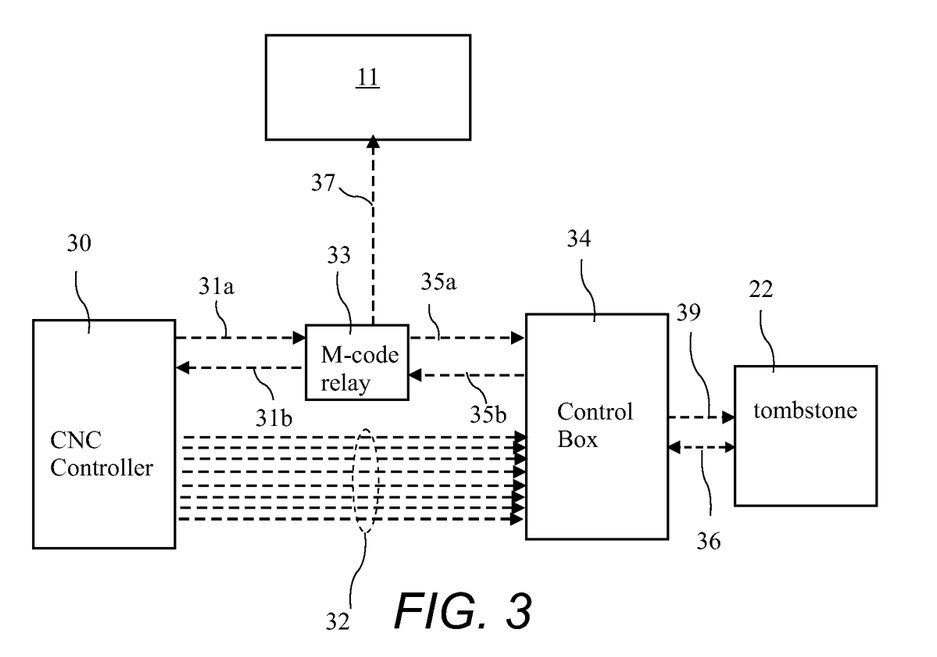
FIG. 3 is a functional diagram for the horizontal milling machine including rotating workpiece holding fixtures attached to a tombstone according to the present invention.

A functional diagram for the horizontal milling machine 11 including the rotating workpiece holding fixtures 24 attached to the tombstone 22 is shown in FIG. 3. A CNC controller 30 includes CNC programs having, among other code, M-codes and G-codes. M-codes are activate commands and G-codes are operations. The operations described by the G-codes are executed only after the corresponding M-code is executed. The G-codes used by the present invention produce a set of parallel CNC position commands 32 sent to a control box 34 describing a set of positions for the rotating workpiece holding fixtures 24, and the corresponding M-code produces an activate signal 31a sent to the M-code relay 33 to initiate a motion of the rotating workpiece holding fixtures 24 described by the parallel CNC position commands 32. The parallel CNC position commands 32 are preferably carried over an RS232 cable from the CNC controller 30 to the control box 34. After receiving the activate signal 31a, the M-code relay 33 provides a initiate motion signal 35a to the control box 34. The M-code relay 33 also provides a control signal 37 to the horizontal mill 11 to prevent machining while workpiece holders are in motion.

The control box 34 multiplexes the multiplicity of parallel CNC commands 32 which may be stored in the control box 34 for future use. After receiving the initiate motion signal 35a indicating that the rotating workpiece holding fixtures 24 can be moved (i.e., when machining has stopped), the control box 34 sends a multiplexed signal over data signal interface 36 to the tombstone 22 to control positions each of the rotating workpiece holding fixtures 24. The tombstone 22 receives a power signal 39 from the control box 34 to power the rotating workpiece holding fixtures 24.

The control box 34 receives position information back over the signal interface 36 and when the rotating workpiece holding fixtures 24 have reached the commanded positions, the control box 34 sends a motion complete signal 35b back to the M-code relay 33, which forwards a motion complete signal (e.g., an M-fin signal) 31b to the CNC controller 30, and the CNC controller 30 executes the next command in the CNC program.

Figure 4:
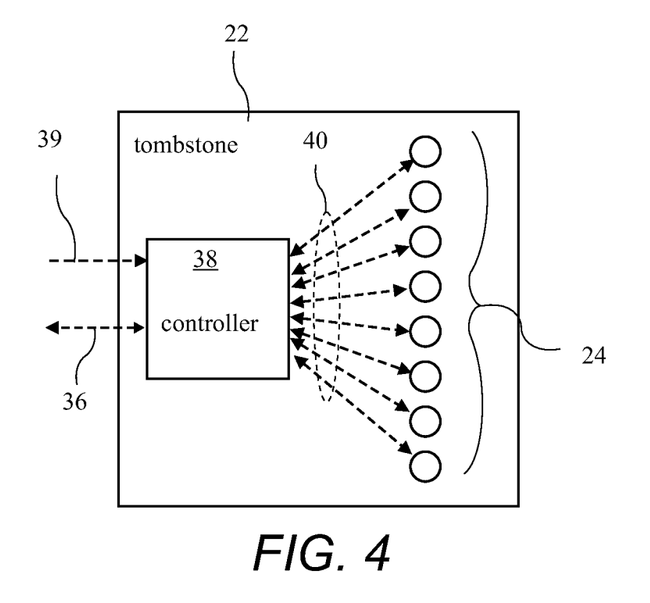
FIG. 4 shows electrical details of the tombstone according to the present invention.

Signal details of the tombstone 22 are shown in FIG. 4. A controller 38 receives and de-multiplexes the multiplexed CNC position commands 32 received over signal interface 36 for each of the rotating workpiece holding fixtures 24. Individual rotating workpiece holding fixtures 24 receive commands over interface 40 between the controller 38 and each of the each rotating workpiece holding fixture 24, and the signal interface 40 carries position information for each of the rotating workpiece holding fixtures 24 back to the controller 38. When all of the CNC position commands 32 have been completed, a motion complete signal is sent to the control box 34 over the interface 36.

Figures 5A, 5B:
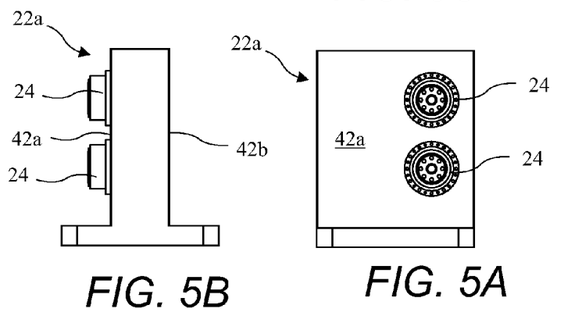
FIG. 5A is a front view of the tombstone according to the present invention having two rotating workpiece holding fixtures.
FIG. 5B is a side view of the tombstone according to the present invention having two rotating workpiece holding fixtures.
Figure 5C:
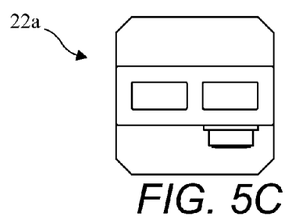
FIG. 5C is a top view of the tombstone according to the present invention having two rotating workpiece holding fixtures.
Figure 6:
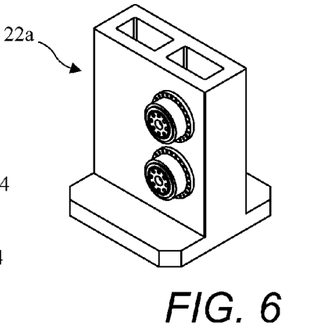
FIG. 6 is a perspective view of the tombstone according to the present invention having two rotating workpiece holding fixtures.

A front view of the tombstone 22a according to the present invention having two rotating workpiece holding fixtures 24 is shown in FIG. 5A, a side view of the tombstone 22a according to the present invention having two rotating workpiece holding fixtures 24 is shown in FIG. 5B, a top view of the tombstone 22a according to the present invention having two rotating workpiece holding fixtures 24 is shown in FIG. 5C, and a perspective view of the tombstone 22a according to the present invention having two rotating workpiece holding fixtures 24 is shown in FIG. 6. The tombstone 22a has two rotating workpiece holding fixtures 24 vertically separated on a first face 42a of the tombstone 22a. The rotating workpiece holding fixtures 24 could be horizontally separated or diagonally separated, or on opposite faces 42a and 42b of the tombstone 22a. The rotating workpiece holding fixtures 24 may be centered on one or both faces 42a and 42b for carrying large workpieces.

Figures 7A, 7B:
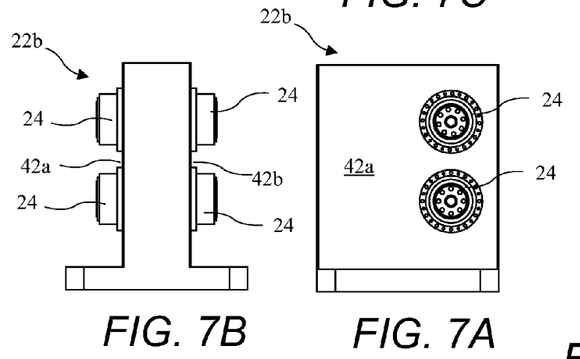
FIG. 7A is a front view of the tombstone according to the present invention having four rotating workpiece holding fixtures.
FIG. 7B is a side view of the tombstone according to the present invention having four rotating workpiece holding fixtures.
Figure 7C:
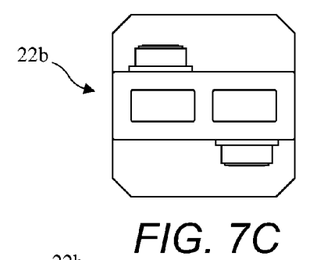
FIG. 7C is a top view of the tombstone according to the present invention having four rotating workpiece holding fixtures.
Figure 8A:
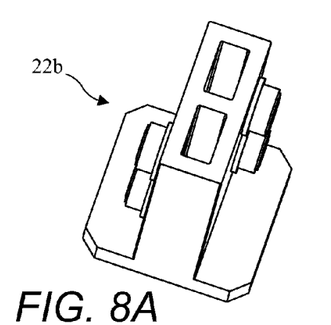
FIG. 8A is a first perspective view of the tombstone according to the present invention having four rotating workpiece holding fixtures.
Figure 8B:
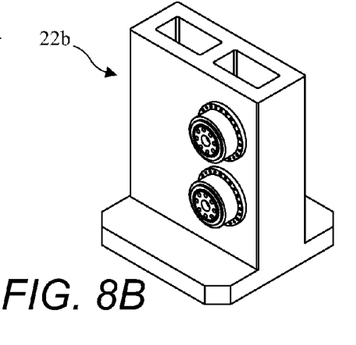
FIG. 8B is a second perspective view of the tombstone according to the present invention having four rotating workpiece holding fixtures.

A front view of the tombstone 22b according to the present invention having four rotating workpiece holding fixtures 24 is shown in FIG. 7A, a side view of the tombstone 22b according to the present invention having four rotating workpiece holding fixtures 24 is shown in FIG. 7B, a top view of the tombstone 22b according to the present invention having four rotating workpiece holding fixtures 24 is shown in FIG. 7C, a first perspective view of the tombstone 22b according to the present invention having four rotating workpiece holding fixtures 24 is shown in FIG. 8A, and a second perspective view of the tombstone 22b according to the present invention having four rotating workpiece holding fixtures 24 is shown in FIG. 8B. The tombstone 22b has two rotating workpiece holding fixtures 24 vertically separated on the first face 42a of the tombstone 22b and two rotating workpiece holding fixtures 24 vertically separated on the second face 42b.

Figures 9A, 9B, 9C, 10:
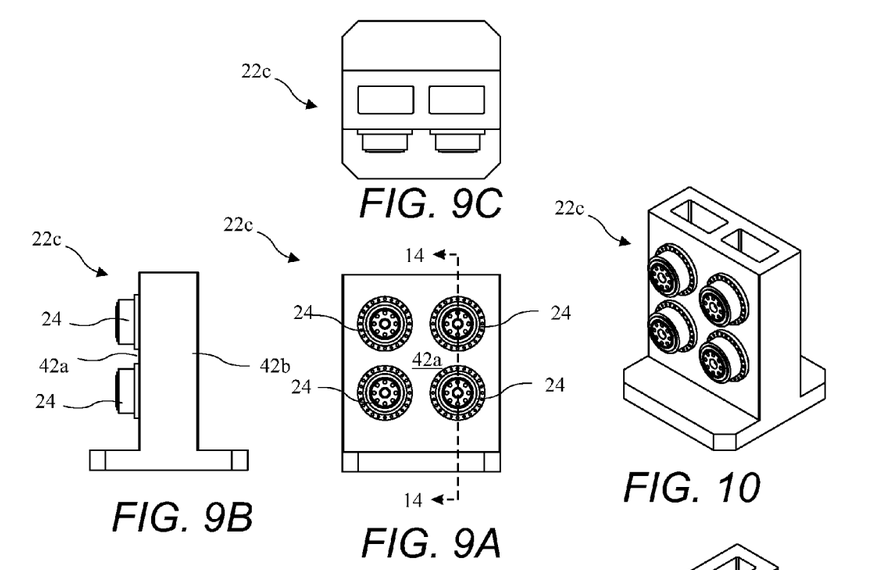
FIG. 9A is a front view of the tombstone according to the present invention having four rotating workpiece holding fixtures on the same face of the tombstone.
FIG. 9B is a side view of the tombstone according to the present invention having four rotating workpiece holding fixtures on the same face of the tombstone.
FIG. 9C is a top view of the tombstone according to the present invention having four rotating workpiece holding fixtures on the same face of the tombstone.
FIG. 10 is a perspective view of the tombstone according to the present invention having four rotating workpiece holding fixtures on the same face of the tombstone.

A front view of a tombstone 22c according to the present invention having four rotating workpiece holding fixtures 24 on the first face 42a of the tombstone 22c is shown in FIG. 9A, a side view of the tombstone 22c having four rotating workpiece holding fixtures 24 on the first face 42a of the tombstone 22c is shown in FIG. 9B, a top view of the tombstone 22c having four rotating workpiece holding fixtures 24 on the first face 42a of the tombstone 22c is shown in FIG. 9B, and a perspective view of the tombstone 22c having four rotating workpiece holding fixtures 24 on the first face 42a of the tombstone 22c is shown in FIG. 10.

Figures 11A, 11B, 11C, 12A, 12B:
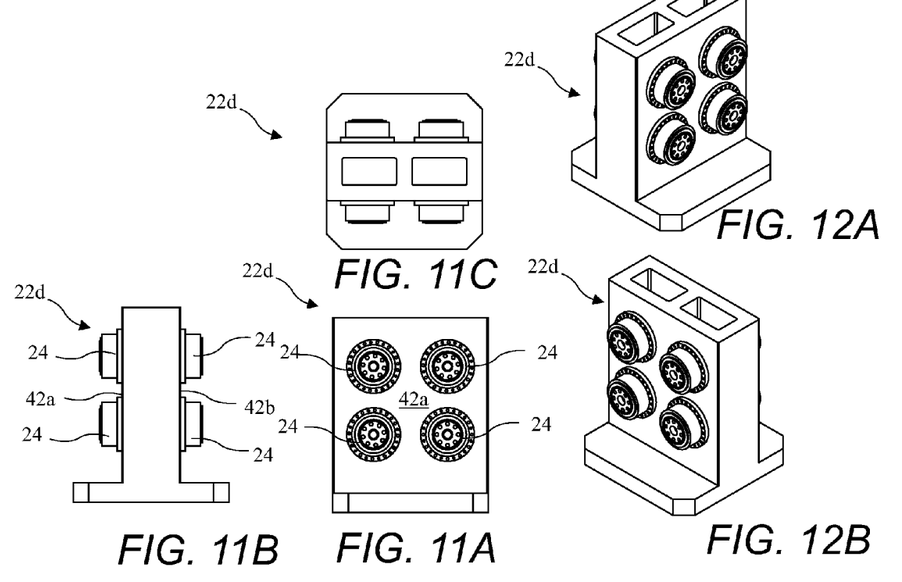
FIG. 11A is a front view of the tombstone according to the present invention having eight rotating workpiece holding fixtures.
FIG. 11B is a side view of the tombstone according to the present invention having eight rotating workpiece holding fixtures.
FIG. 11C is a top view of the tombstone according to the present invention having eight rotating workpiece holding fixtures.
FIG. 12A is a first perspective view of the tombstone according to the present invention having eight rotating workpiece holding fixtures.
FIG. 12B is a second perspective view of the tombstone according to the present invention having eight rotating workpiece holding fixtures.

A front view of a tombstone 22d according to the present invention having eight rotating workpiece holding fixtures 24 is shown in FIG. 11A, a side view of the tombstone 22d having eight rotating workpiece holding fixtures 24 is shown in FIG. 11B, a top view of the tombstone 22d having eight rotating workpiece holding fixtures 24 is shown in FIG. 11C, a first perspective view of the tombstone 22d having eight rotating workpiece holding fixtures 24 is shown in FIG. 12A, and a second perspective view of the tombstone 22d having eight rotating workpiece holding fixtures 24 is shown in FIG. 12B.

Figure 13:
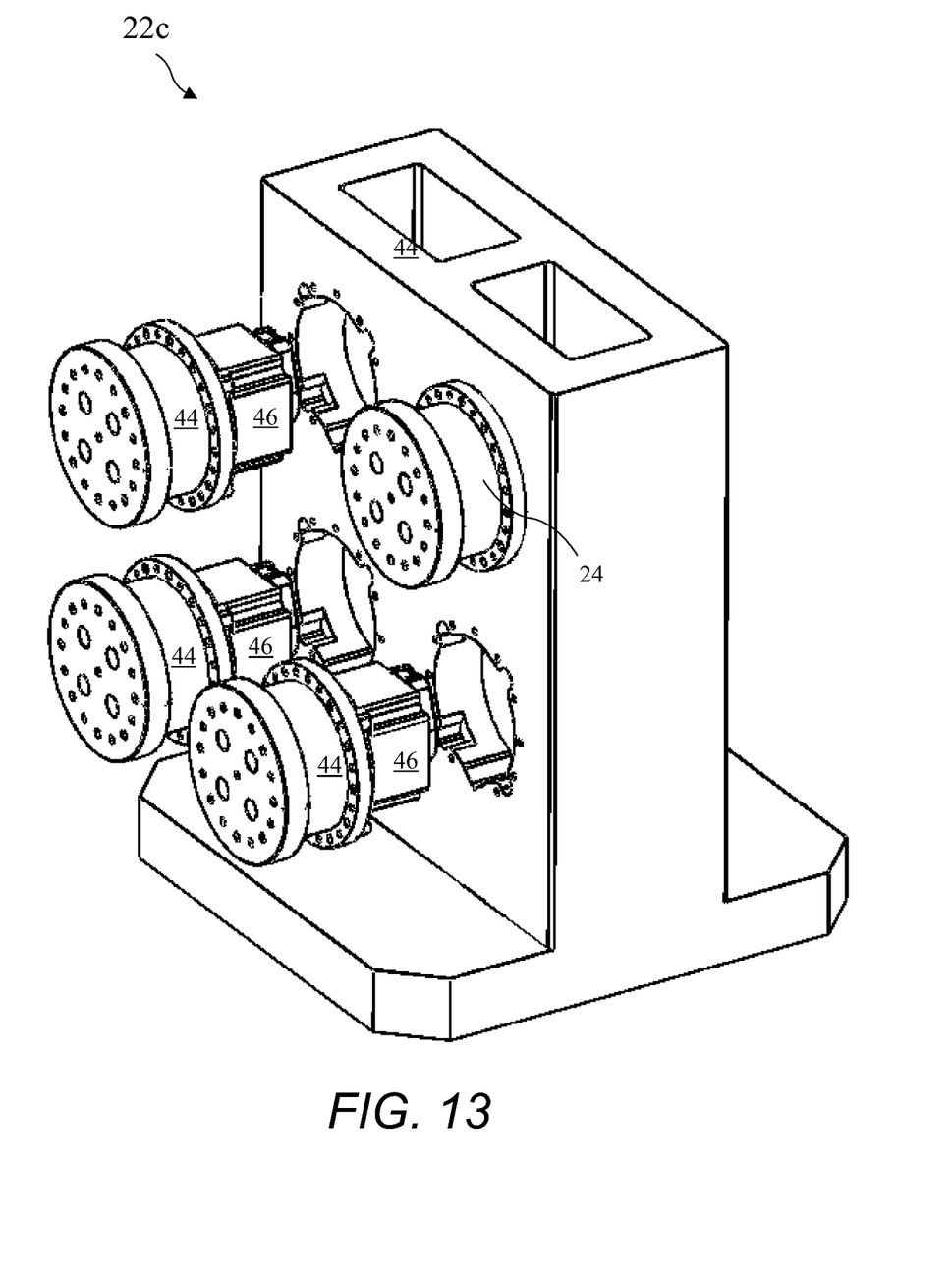
FIG. 13 is an exploded perspective view of the tombstone according to the present invention having four rotating workpiece holding fixtures.
Figure 14:
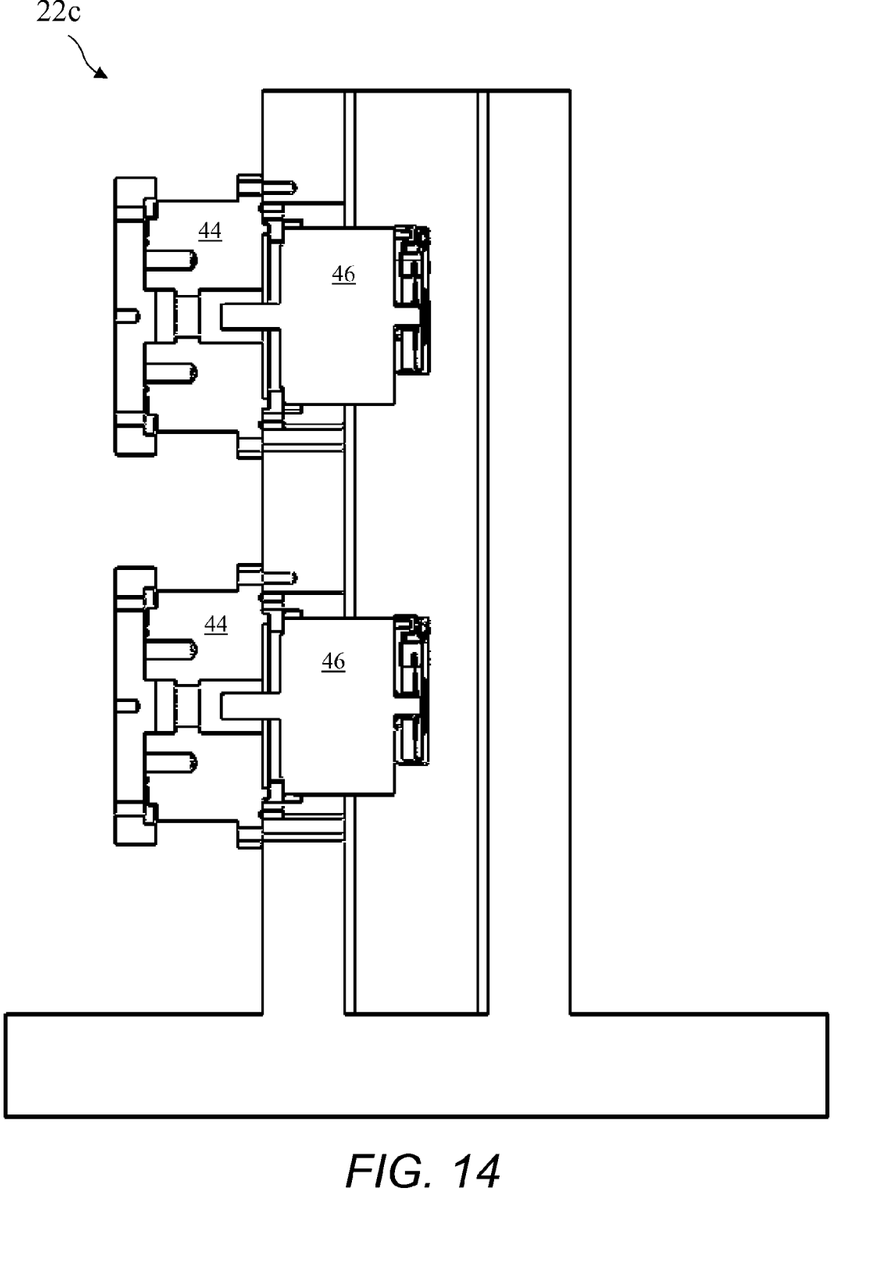
FIG. 14 is a cross-sectional view of the tombstone according to the present invention having four rotating workpiece holding fixtures taken along line 14-14 of FIG. 9A.
Figure 15:
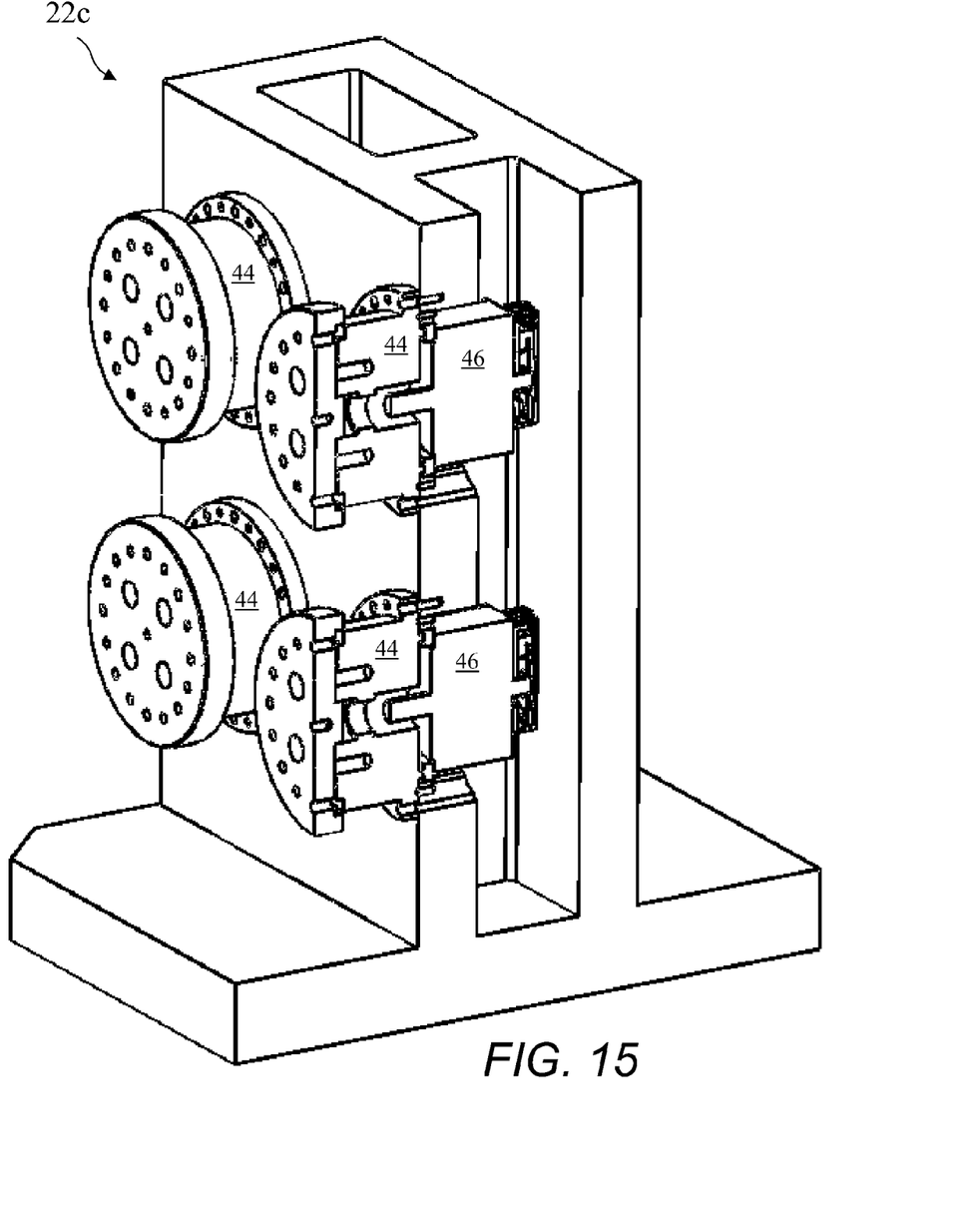
FIG. 15 is a cross-sectional perspective view of the tombstone according to the present invention having four rotating workpiece holding fixtures taken along line 14-14 of FIG. 9A.

An exploded perspective view of the tombstone 22c having four rotating workpiece holding fixtures 24 is shown in FIG. 13, a cross-sectional view of the tombstone 22c taken along line 14-14 of FIG. 9A is shown in FIG. 14, and a cross-sectional perspective view of the tombstone 22c taken along line 14-14 of FIG. 9A is shown in FIG. 15. The rotating workpiece holding fixtures 24 are preferably harmonic drives 44 driven by servo motors 46, for example, the Harmonic Systems model number CSG-32-160-2UH-SPxxx harmonic drive. The commonly used rotating workpiece holders (or indexers) for milling machines uses a screw drive. Unfortunately, a screw drive is to big and bulky to fit into a tombstone. Additionally, the harmonic drive provides a gear ratio (a reduction) of at least 50 to 1, and preferably about 160 to 1, which combined with the braking of the servo motor has an important benefit of preventing the workpiece from rotating during milling. The preferred harmonic drive and servo motor provides about 250 Mn of torque.

Standard horizontal milling machines use CNC programs which include G-Code and M-Code to control the machine. M-Codes may be used to trigger auxiliary outputs (e.g., activate and de-activate signals sent to external devices) which enable users to control and monitor the external devices. The CNC controllers 30 also have an RS232 output port configured to communicate with the external devices to describe operations. To use the RS232 port, special commands called DPRNT commands are used to send information from the RS232 port. The present invention uses the M-Codes activate signals and RS232 port to control the rotating workpiece holding fixtures 24. The DPRNT commands contain information about the angle to which each rotating workpiece holding fixtures 24 is commanded to rotate, and the M-Code triggers the rotating workpiece holding fixtures 24 to start rotating.

When the CNC controller 30 encounters an M-Code, the CNC controller 30 sends the activate signal to turn on the low voltage M-code relay 33 and waits for conformation (e. g., the M-fin signal). The activate signal is forwarded to the control box 34 and initiates rotation the rotating workpiece holding fixtures 24 on the tombstone 22 to the proper angle(s). Once the movement is completed, the control box 34 sends back a completed signal 35b to the M-code relay 33 which sends the M-fin signal 31b to the CNC controller 30 allowing the CNC machine to continue with the next operation. Using this DPRNT command along with the M-Code allows each indexer to move simultaneously or independently.

Examples of sample codes are:

Sample programming for Tombstone and Turnnion (independent movements on drives):

DPRNT[C1*90.]; (Moves top left side drive clockwise to 90°)

M21; (or user defined M-Code)

DPRNT[C2*180.]; (Moves top right side drive clockwise to 180°)

M21; (or user defined M-Code)

DPRNT[C3*-180.] (Moves bottom left side drive clockwise to −180°)

M21; (or user defined M-Code)

DPRNT[C4*25.] (Moves bottom left side drive clockwise to 25°))

M21; (or user defined M-Code); and

Sample programming for Tombstone and Turnnion (simultaneous movements on drives):

DPRNT[C1*90.]; (Moves top left side drive clockwise to 90°)

DPRNT[C2*180.]; (Moves top right side drive clockwise to 180°)

DPRNT[C3*-180.] (Moves bottom left side drive clockwise to −180°)

DPRNT[C4*25.] (Moves bottom left side drive clockwise to 25°)

M21; (or user defined M-Code)

While the invention herein disclosed has been described by means of specific embodiments and applications thereof, numerous modifications and variations could be made thereto by those skilled in the art without departing from the scope of the invention set forth in the claims.

We claim:

1. A CNC controlled horizontal mill and rotating workpiece holder comprising:
- a tombstone attached to the horizontal mill;
- at least one CNC controlled rotating workpiece holding fixture mounted to the tombstone;
- a CNC controller generating rotating workpiece holding fixture commands for each rotating workpiece holding fixture;
- an M-code relay receiving activation signals from the CNC controller and forwarding the activation signals to a control box;
- a CNC position command for each rotating workpiece holding fixture generated by the CNC controller and provided to the control box;

multiplexed position commands generated by the control box and provided to the tombstone after receiving the activation signal;
a controller residing in the tombstone and receiving the multiplexed position commands and de-multiplexing the position commands to obtain individual rotating workpiece holding fixtures commands;
communication between the controller and the rotating workpiece holding fixture providing signals to the rotating workpiece holding fixtures and providing rotating workpiece holding fixture position information back to the controller;
communications from the controller to the control box providing a first motion finished signal to the control box;
communication between the control box and the M-code relay providing a second motion finished signal to the M-code relay; and
communication between the M-code relay and the CNC controller providing a third motion finished signal to the CNC controller.

2. The apparatus of claim 1, wherein the communication between the control box and the tombstone are hard wired communications.

3. The apparatus of claim 1, wherein the communication between the control box and the tombstone are wireless communications.

4. The apparatus of claim 1, wherein the rotating workpiece holding fixtures comprise between one and eight rotating workpiece holding fixtures.

5. The apparatus of claim 1, wherein each rotating workpiece holding fixture includes:
a harmonic drive; and
a servo motor.

6. The apparatus of claim 5, wherein the harmonic drive has a ratio of at least 50 to 1.

7. The apparatus of claim 6, wherein the harmonic drive has a ratio of about 160:1.

8. The apparatus of claim 1, wherein the rotating workpiece holding fixtures are controlled using existing auxiliary outputs of the CNC controller.

9. The apparatus of claim 8, wherein the position commands for each rotating workpiece holding fixture generated by the CNC controller are G-code commands.

10. A CNC controlled horizontal mill and rotating workpiece holder comprising:
a tombstone attached to the horizontal mill;
between two and eight CNC controlled rotating workpiece holding fixture mounted to the tombstone, each rotating workpiece holding fixture including:
a harmonic drive; and
a servo motor;
a CNC controller executing a CNC program including M-codes and G-codes generating rotating workpiece holding fixture commands for each rotating workpiece holding fixture;
an M-code relay receiving activation signals from the CNC controller triggered by the M-code and forwarding the activation signals to a control box;
parallel DPRNT commands for each rotating workpiece holding fixture generated by the CNC controller based on instruction in the G-code and provided to the control box;
multiplexed parallel DPRNT commands generated by the control box and provided to the tombstone after receiving the activation signal from the M-code relay;
a controller residing in the tombstone and receiving the multiplexed position commands and de-multiplexing the position commands to obtain individual rotating workpiece holding fixtures commands;
communication between the controller and the rotating workpiece holding fixture providing signals to the rotating workpiece holding fixtures and providing rotating workpiece holding fixture position information back to the controller;
communications from the controller to the control box providing a first motion finished signal to the control box;
communication between the control box and the M-code relay providing a second motion finished signal to the M-code relay; and
communication between the M-code relay and the CNC controller providing a third motion finished signal to the CNC controller.

11. A method for providing a fifth CNC controlled axis, the method comprising:
attaching a tombstone to the horizontal mill;
attaching between two and eight CNC controlled rotating workpiece holding fixture mounted to the tombstone, each rotating workpiece holding fixture including:
a harmonic drive; and
a servo motor;
executing a CNC program including M-codes and G-codes generating rotating workpiece holding fixture commands for each rotating workpiece holding fixture;
sending parallel DPRNT commands to a control box for each rotating workpiece holding fixture, the parallel DPRNT commands generated by the CNC controller based on instruction in the G-code and provided to the control box;
multiplexing the parallel DPRNT commands to provide a multiplexed signal;
sending activation signals from the CNC controller to an M-code relay, the sending triggered by the M-code;
forwarding the activation signals to a control box;
providing the multiplexed parallel DPRNT commands generated by the control box to the tombstone after receiving the activation signal from the M-code relay;
receiving the multiplexed parallel DPRNT commands by a controller residing in the tombstone and de-multiplexing the multiplexed parallel DPRNT commands to obtain individual rotating workpiece holding fixtures commands;
providing position signals to the rotating workpiece holding fixtures and providing rotating workpiece holding fixture position information back to the controller;
communicating from the controller to the control box providing a first motion finished signal to the control box;
communicating between the control box and the M-code relay providing a second motion finished signal to the M-code relay; and
communicating between the M-code relay and the CNC controller providing a third motion finished signal to the CNC controller.

* * * * *